United States Patent [19]

Hofius

[11] Patent Number: 4,887,359

[45] Date of Patent: Dec. 19, 1989

[54] VEHICLE LEVELING AND STABILIZING APPARATUS

[76] Inventor: Walter E. Hofius, 4030 W. 118th St., Bloomington, Minn. 53437

[21] Appl. No.: 227,003

[22] Filed: Jul. 18, 1988

Related U.S. Application Data

[62] Division of Ser. No. 12,327, Feb. 9, 1987, Pat. No. 4,784,400.

[51] Int. Cl.$^4$ .......................... G01C 9/06; B60Q 1/52
[52] U.S. Cl. ........................................ 33/366; 33/291; 33/333
[58] Field of Search ................. 33/391, 396, 366, 397, 33/333

[56] References Cited

U.S. PATENT DOCUMENTS 3,669,409  6/1972  Eranosian .
3,962,693  6/1976  Schamblin ........................ 33/366 X
4,760,649  8/1988  Preston ............................. 33/391 X

FOREIGN PATENT DOCUMENTS 218964  9/1924  United Kingdom ................. 33/396

Primary Examiner—Harry N. Haroian
Attorney, Agent, or Firm—Burd, Bartz & Gutenkauf

[57] ABSTRACT

A level sensor usable in a vehicle leveling and stabilizing apparatus particularly adapted for use with a motor home to level and stabilize the vehicle upon irregular terrain preparatory to camping or such activity. The apparatus includes a plurality of jack stand assemblies, one associated with each vehicle quadrant. Level sensors are connected to the motor vehicle to indicate level or off-level condition from front to rear and from side to side. A control panel within the vehicle carries the power unit controls and level indicators lamps. The level sensor includes a plate like pendulum suspended within a housing and constrained for back and forth pivotal movement in a fixed path. Electrical contacts are disposed on either side of the pendulum for making or breaking an electrical circuit responsive to pivotal movement of a pendulum as occurs when the housing is placed in an off level condition.

17 Claims, 5 Drawing Sheets

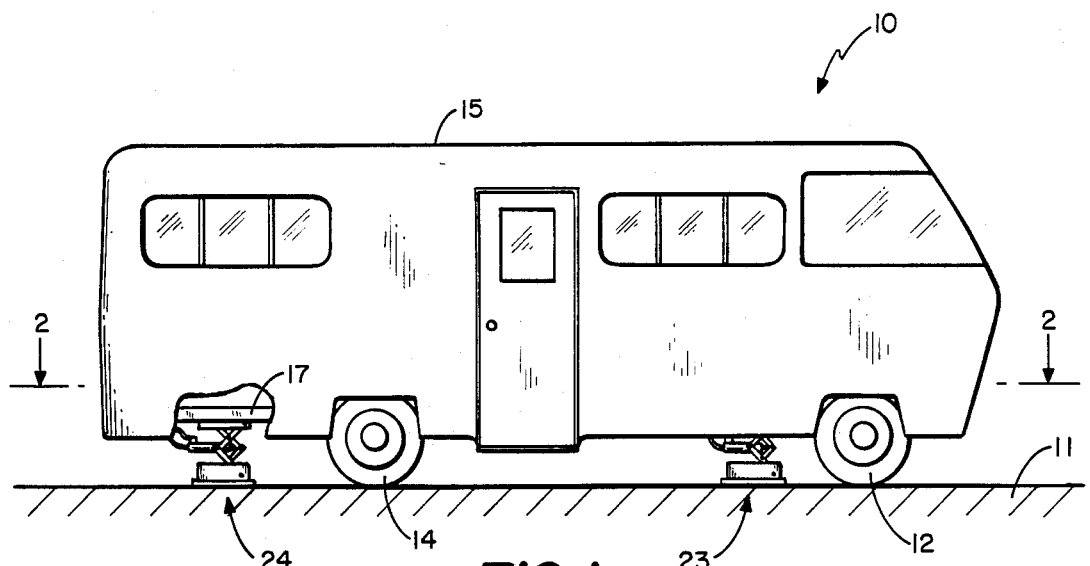
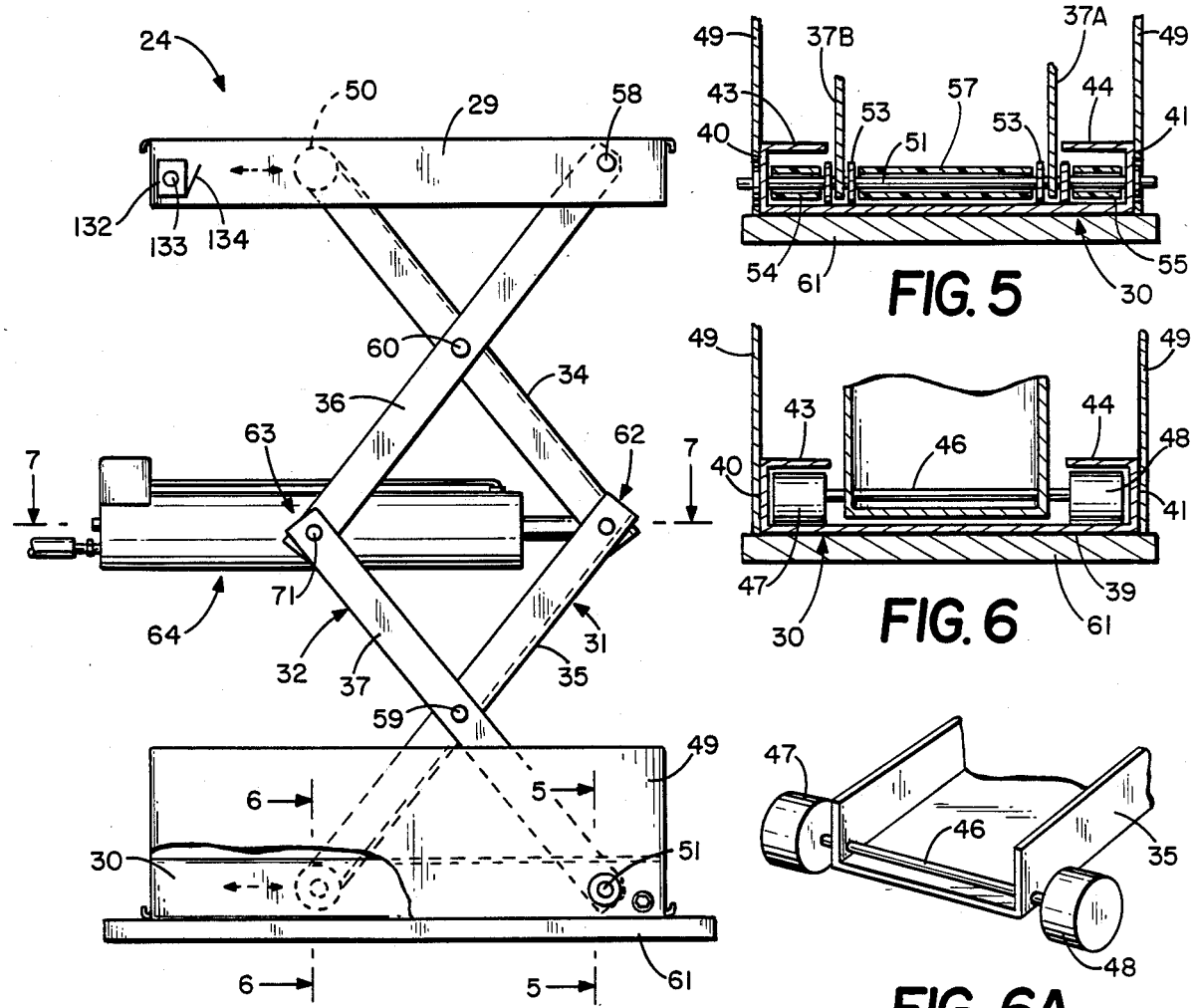

VEHICLE LEVELING AND STABILIZING APPARATUS

CROSS REFERENCE TO RELATED APPLICATION

This application is a divisional application of U.S. application Ser. No. 12,327 filed Feb. 9, 1987 entitled Vehicle Leveling and Stabilizing Apparatus, now U.S. Pat. No. 4,784,400 issued Nov. 15, 1988.

BACKGROUND OF THE INVENTION

Recreational vehicles, such as motor homes, are preferably leveled and stabilized when parked for convenience and comfort. Stabilizing the vehicle reduces "vibration and bouncing upon movement inside". Leveling and stabilizing systems frequently include four jacks placed under separate quadrants of the vehicle. The jacks or stands require separate adjustment. Manually adjusting them takes time, and exposes the vehicle operator to outside elements. Such trial and error procedure may or may not result in a level vehicle.

SUMMARY OF THE INVENTION

The invention relates to a level sensor apparatus particularly adapted for use with leveling apparatus installed on recreational vehicles such as motor homes. A vehicle leveling apparatus includes four hydraulic leveling jack stand assemblies positionable proximate corners of the frame of the vehicle. jack stand assembly includes a double acting hydraulically actuated scissor-type jack, extendable and retractable through hydraulic control from the cab of the vehicle. Each jack is raised and lowered by a double acting linear hydraulic power unit controlled by solenoid operated valves. The sensor includes a housing and an electrically conductive pendulum pivotally connected to the housing constrained for rotation in a single direction. Electrical contacts are located on each side of the pendulum in its rotational path. When the pendulum rotates responsive to off level conditions, it makes or breaks contact with an electrical lead to give an off-level indication. Front and rear level sensors according to the invention are attached to the vehicle at appropriate locations such as the body frame or floor for indicating front and rear leveling of the vehicle about its longitudinal axis. An intermediate level sensor is fixed to the vehicle for indicating level orientation about a lateral axis perpendicular to the longitudinal axis. The level sensor are independent, each having indicator lamps on the control panel to indicate a level or an off level condition.

IN THE DRAWINGS

FIG. 1 is a side elevational view of a motor home having a leveling apparatus with level sensors according to the invention;

FIG. 3 is a side elevational view of a jack stand assembly of the leveling apparatus in an extended position;

FIG. 5 is an enlarged sectional view of a portion of the jack stand assembly of FIG. 3 taken along the line 5—5 thereof;

FIG. 6 is another enlarged sectional view of a portion of the jack stand assembly of FIG. 3 taken along the line 6—6 thereof;

FIG. 6A is an enlarged perspective view of a portion of the foot of the jack stand shown in FIG. 6;

DESCRIPTION OF A PREFERRED EMBODIMENT

Figure 2:
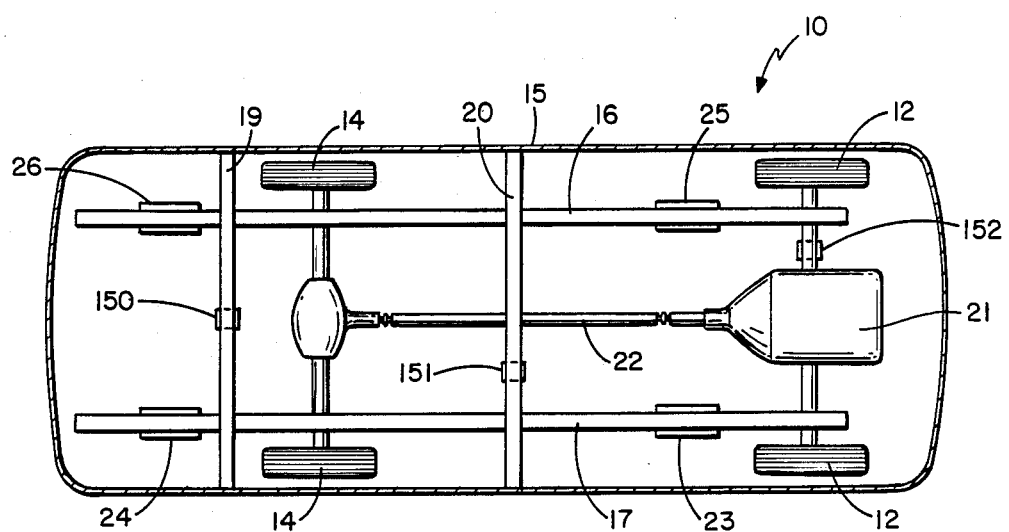
FIG. 2 is a schematic top plan view of the motor home of FIG. 1, taken along the line 2—2 thereof.

Referring to the drawings there is shown a recreational vehicle comprised as a motor home 10 in side elevational view in FIG. 1, and schematically in top plan view in FIG. 2, equipped with a vehicle leveling assembly having level sensors according to the present invention. Motor home 10 is normally supported on the ground 11 by front wheels 12 and rear wheels 14 carrying a body 15. Body 15 is carried on a frame comprised of longitudinal fame members 16, 17 extending substantially the length thereof and connected to wheel assemblies carrying the front and rear wheels 12, 14. A plurality of transverse or lateral members such as members 19, 20 extend across the longitudinal frame members 16, 17 and support an interior floor (not shown). Motor home 10 also includes the usual engine 21 and drive train 22. Motor home 10 normally travels over the road on wheels 12, 14 driven by the engine 21. When stopped as for parking and camping, the motor home might be located on irregular terrain. For purposes of convenience and comfort, it is desireable to stabalize and, if necessary, level the motor home with the vehicle leveling apparatus through use of level sensors of the invention. A plurality of jack stand assemblies are located generally at quadrants of the motor home in order to permit universal leveling. First and second jack stand assemblies 23, 24 are located at the front and rear right quadrants of the motor home 10 and are attached to the right longitudinal support beam 17. Third and fourth jack stand assemblies 25, 26 are assembled at front and rear left quadrants of the motor home assembled to the left longitudinal support beam 16 (FIG. 2).

Figure 4:
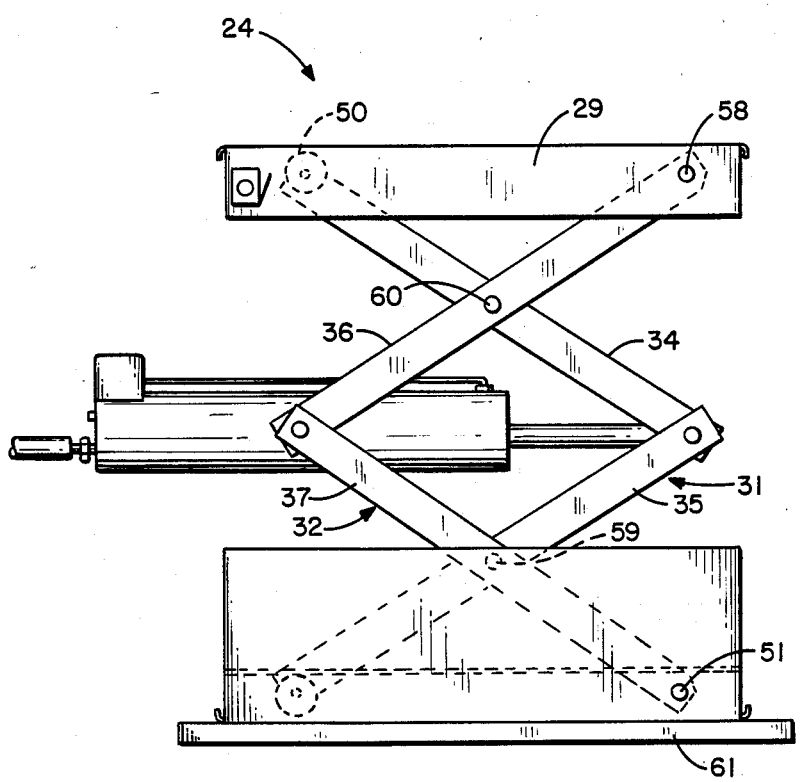
FIG. 4 is a side elevational view of the jack stand assembly of FIG. 3 in a partially retracted position.

The jack stand assemblies 24–26 are hydraulically operated and identical in construction, the right rear jack stand 24 being exemplary and shown in enlarged view in FIGS. 3 and 4 for purposes of illustration. Jack stand assembly 24 includes a hydraulically actuated scissors-type jack having pairs of articulated legs with central portions moveable toward and away from one another with resultant raising and lowering the stand. An upper or mounting plate 29 and a lower or support plate 30 are connected by articulated leg assemblies 31, 32. The leg assemblies are extendable and retractable to move the mounting plate and support plate toward and away from one another to raise and lower the supported portion of motor home 10.

First leg assembly 31 is comprised of upper and lower pivotally connected channel-shaped leg members 34, 35. Second leg assembly 32 includes upper and lower pivotally connected leg sections 36, 37. As shown in FIG. 6, support plate 30 has a flat horizontal base 39 and perpendicular side walls 40, 41, upwardly extended from the base 39. Inwardly extended flanges 43, 44 extend from sidewalls 40, 41 forming inwardly facing side channels. As shown in FIG. 6A, channel-shaped leg member 35 is upwardly open. An axel 46 extends transversely across the lower end of leg member 35 and passes through suitable openings of the side walls 40, 41. Rollers 47, 48 are assembled to opposite ends of the axel 46 outside of the side walls 40, 41. As shown in FIG. 6, the rollers 47, 48 are located in the side channels of support plate 30 constrained for longitudinal movement carrying the lower end of lower leg member 35 of the first leg assembly 31.

Flat plate-like shields 49 straddle support plate 30 and extend upward from it, attached thereto by suitable fasteners or bolts. The shields 49 protect the jack stand assembly when retracted during over the road travel. A foot pad 61 is fixed to the lower surface of support plate 30 to provide a wide, replaceable ground engaging surface.

Mounting plate 29 is constructed in like support plate 30. The upper leg member 34 of first leg assembly 31 carries a roller assembly indicated generally at 50 in FIGS. 3 and 4 at the upper end thereof for symmetrical movement of the upper end of the upper leg member 34 along with the lower end of the lower leg member 35.

The lower leg section 37 of the second leg assembly 32 is comprised of parallel linear leg members 37A, 37B as shown in FIG. 5. A pivot rod 51 extends transversely across the support plate 30 near the end thereof connecting the lower leg section 37 to the support plate 30. The lower ends of the leg section members 37A, B pivotally engage the pivot rod 51 for rotation about a fixed axis. Washers 53 fixed to rod 51 are disposed on either side of the ends of leg members 37A, B. Washers 53 bear the weight imposed upon leg members 37A, 37B and transmit it to support plate 30. Short tubular spacers 54, 55 encompass pivot rod 51 in the side channels of support stand 30. A central tubular spacer 57 encompasses pivot rod 51 between the lower leg members 37A, B. Lower leg section 37 of the second leg assembly 32 is constrained for pivotal movement about a fixed axis defined by the pivot rod 51. The upper leg section 36 of the second leg assembly 32 is assembled in like fashion to the mounting plate 29 for pivotal movement about an upper pivot rod 58 extended transversely across the mounting stand 29 near an end thereof, parallel to the lower pivot rod 51.

Lower leg section 37 of second leg assembly 32 and lower leg member 35 of the first assembly 31 are centrally connected by a pivot pin 59. The lower leg section members 37A, B straddle the lower leg member 35 at a point of intersection of pivot pin 59. In like fashion, the upper leg sections 36 are centrally and pivotally connected to the upper leg member 34 of the first leg assembly 31 by a pivot pin 60.

Adjacent ends of upper and lower leg members of the first leg assembly 31 are pivotally connected by pivot assembly 62. Adjacent portions of upper and lower leg sections 36, 37 of the second leg assembly 32 are pivotally connected by a pivot assembly 63. Hydraulic power unit 64 acts between the pivot assemblies 62, 63 to move them together and apart to raise and lower the jack stand 24. Hydraulic power unit 64 is of the reciprocating cylinder-rod variety having a cylinder 66 and a reciprocating rod 67. The end of the rod 67 is connected to one leg assembly pivot and the end of cylinder 66 to the other. Extension and retraction of the rod with respect to the cylinder accomplished lowering and raising of the jack stand assembly.

Figure 7:
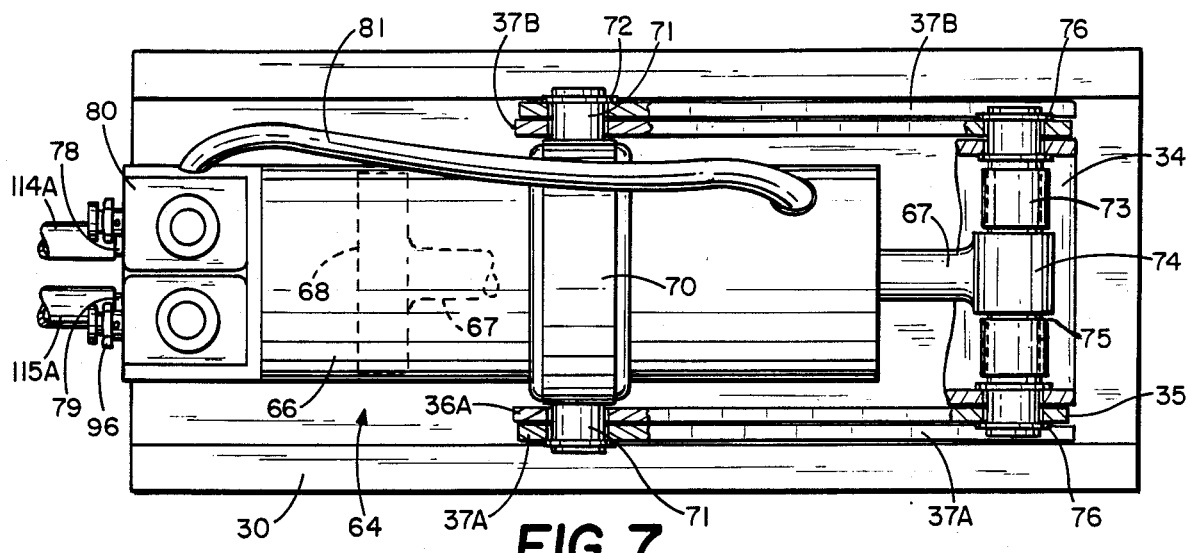
FIG. 7 is an enlarged top plan view, partly in section, showing the hydraulic power unit of the jack stand assembly of FIG. 3 and taken along the line 7—7.

Each of the jack stand assemblies 23 through 26 is operable by a double acting hydraulic power unit of the cylinder-rod variety. Second hydraulic power unit 64 on the right rear jack stand assembly is exemplary. Hydraulic power unit 64 has a cylinder 66 and the reciprocating rod 67 (see FIGS. 7 and 8). Rod 67 is interiorly connected to a reciprocating piston 68 shown in phantom in FIG. 7 located interiorly at cylinder 66. A mounting collar 70 surrounds an intermediate outside portion of cylinder 66 and has outwardly extended lateral pivot bosses 71. Pivot bosses 71 are connected to the adjacent end portions of the leg sections 36, 37 in straddling relationship to the cylinder 66 and forming a part of the pivot assembly 63. Adjacent ends of leg sections 36, 37 of leg assembly 32 move with the cylinder 66 and relative to the rod 67. Snap rings 72 fit on the outer ends of the pivot bosses 71 to hold the leg sections in place with respect to the cylinder 66.

The outer end of reciprocating rod 67 is equipped with a tubular shoulder or collar 74 that engages a transverse pivot shaft 75. Ends of pivot shaft 75 engage the adjacent ends of the leg members 34, 35 of the first leg assemby 31 forming a part of the pivot assembly 62. Spacers 73 encompass pivot shaft 75 on either side of collar 74. Snap rings 76 are provided to hold the pivot shaft in place. The pivot shaft 75 and the adjacent ends of leg members 34, 35 move with the rod 67 and relative to the cylinder.

First and second hydraulic ports 78, 79 open to a solenoid actuated valve assembly 80 for inlet and outlet of hydraulic fluid to the cylinder 66 for reciprocation of the piston 68 and rod 67. A hydraulic fluid transfer line 81 extends from the valve assembly 80 to the forward portion of the cylinder 66. Fluid introduced through the first hydraulic port 78 passes through fluid transfer line 81 to the forward portion of cylinder 66. Fluid exiting the forward portion of the cylinder 66 flows back through fluid transfer line 81 and the first hydraulic port 78. Fluid flowing through the second hydraulic port 79 flows into the rear portion of the hydraulic cylinder 66 on the side opposite piston 68. Fluid flowing out of the rear portion of cylinder 66 flows back through the second hydraulic port 79. Introduction of fluid through the first hydraulic port 78 is effective to move the piston 68 in a first direction or from right to left as viewed in FIG. 7 with the resultant extension of the jack stand 24. At the same time, fluid is expelled from the opposite side of hydraulic cylinder 66 through the second hydraulic port 79. Introduction of fluid through the second hydraulic port 79 is effective to move the cylinder 68 in the opposite direction or from left to right as viewed in FIG. 7, moving the rod 67 outward and effecting retraction of the jack stand 24.

Figure 8:
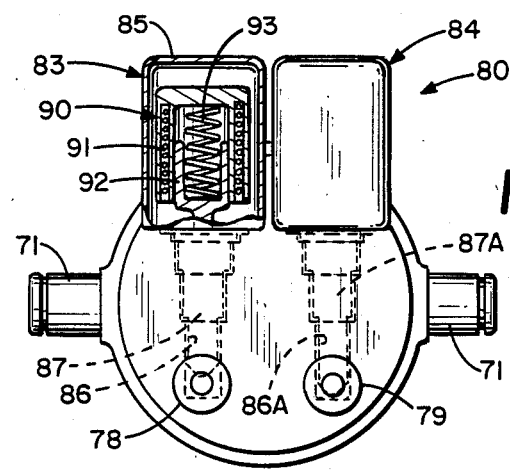
FIG. 8 is an enlarged rear elevational view of the hydraulic power unit of FIG. 7.

As shown in FIG. 8, solenoid valve assembly 80 includes first and second solenoid operated valves 83, 84 associated with the first and second hydraulic ports 78, 79 respectively. Each valve is orientated to permit free-flow of hydraulic fluid under pressure into the cylinder 66 but restrict flow of fluid from the cylinder 66 when the valve is closed. Opening of a valve permits release of hydraulic fluid from the cylinder 66 through the corresponding port as hydraulic fluid under pressure enters the other port and proceeds to the opposite side of the piston 68 for corresponding movement of piston 68 and rod 67.

Solenoid operated valve 83 is typical wherein there is provided a valve opening 86 in the rear portion of the cylinder 68. A valve element 87 has a truncuated conical seat which fits in the bottom of the valve opening 86 to close it. Valve opening 86 is open to the hydraulic port 78. The upper end of the valve element 87 is connected to a solenoid 90, which includes a winding coil 91 surrounding a moveable solenoid plunger 92 connected to the valve element 87 and influenced by a helical compression spring 93. Energizing of the solenoid coil 91 is effective to move the solenoid plunger 92 upward along with the valve element 87. This opens the valve and permits the hydraulic fluid flow from the cylinder 66 through an interior passage through solenoid housing 85 (not shown) connected to the hydraulic fluid delivery line 81 and out of port 78. When the valve is closed, hydraulic fluid under pressure at the port 78 can move the valving element 87 upwardly against the bias of the helical spring 93 and into the cylinder 66 when a lower pressure hydraulic fluid is on the opposite side of the piston 68. A lower pressure is obtained when the opposite valve is opened. When the valve element 87 is closed, hydraulic fluid is prevented from flowing the opposite direction, or from the cylinder 66 through the fluid delivery line 81, and through the interior passage back through the valve opening 86.

The second solenoid operated valve 84 is connected in the same manner to the hydraulic port 79 and the opposite end of cylinder 66 with the exception that an internal passage through the housing of second valve 84 (not shown) leads directly to the interior of the rearward portion of the cylinder 66.

Actuation of the first solenoid switch 83 opens the port 78 to permit outward flow of hydraulic fluid from the forward end of the cylinder 66. The resultant forward movement of the piston 68 and rod 67 results in retraction of the jack stand 24. The first solenoid switch can be identified as the right rear retract solenoid. Actuation of the second solenoid 84 permits hydraulic fluid to flow through the second hydraulic port 79 resulting in movement of the piston 68 toward the rear of the cylinder 66 and retraction of the rod 67. This results in extension of the jack stand 24. The second solenoid switch 84 can be identified as the right rear extend solenoid. Each jack stand 23 through 26 has a hydraulic power unit. Each hydraulic power unit has a solenoid operated valve assembly consisting of two solenoid switches. One is identifiable as the retract solenoid switch, and the other as the extend solenoid switch.

Bleed valves 96 are provided in order to bleed entrapped air from the hydraulic system.

Control of the jack stand assemblies is asserted through a control panel conveniently located in the cab of the motor home proximate other operating instrumentation. A control panel is indicated at 97 in FIG. 9 and includes horizontally aligned toggle switches 98, 99, 101, 102, each toggle switch being associated with one of the jack stand assemblies. As indicated, the first toggle switch 98 is associated with the left rear jack stand assembly, the second toggle switch 99 with the left front, the third toggle switch 101 with the right front, and the fourth toggle switch 102 with the right rear jack stand assembly. Upward movement of a toggle switch is effective to extend the corresponding jack stand assembly, and downward movement is effective to retract the corresponding jack stand assembly. In the case of toggle switch 102 as described above, upward movement of the toggle switch is effective to extend solenoid switch 84, resulting in retraction of the rod 76. Downward movement of the toggle switch is effective to actuate the right rear retract solenoid switch 83, permitting outward flow of hydraulic fluid through the first port 78 while hydraulic fluid under pressure enters the second port 79 resulting in extension of the cylinder rod 67 to retract the jack stand assembly. The entire central panel is subject to on-off switch 103.

Figure 15:
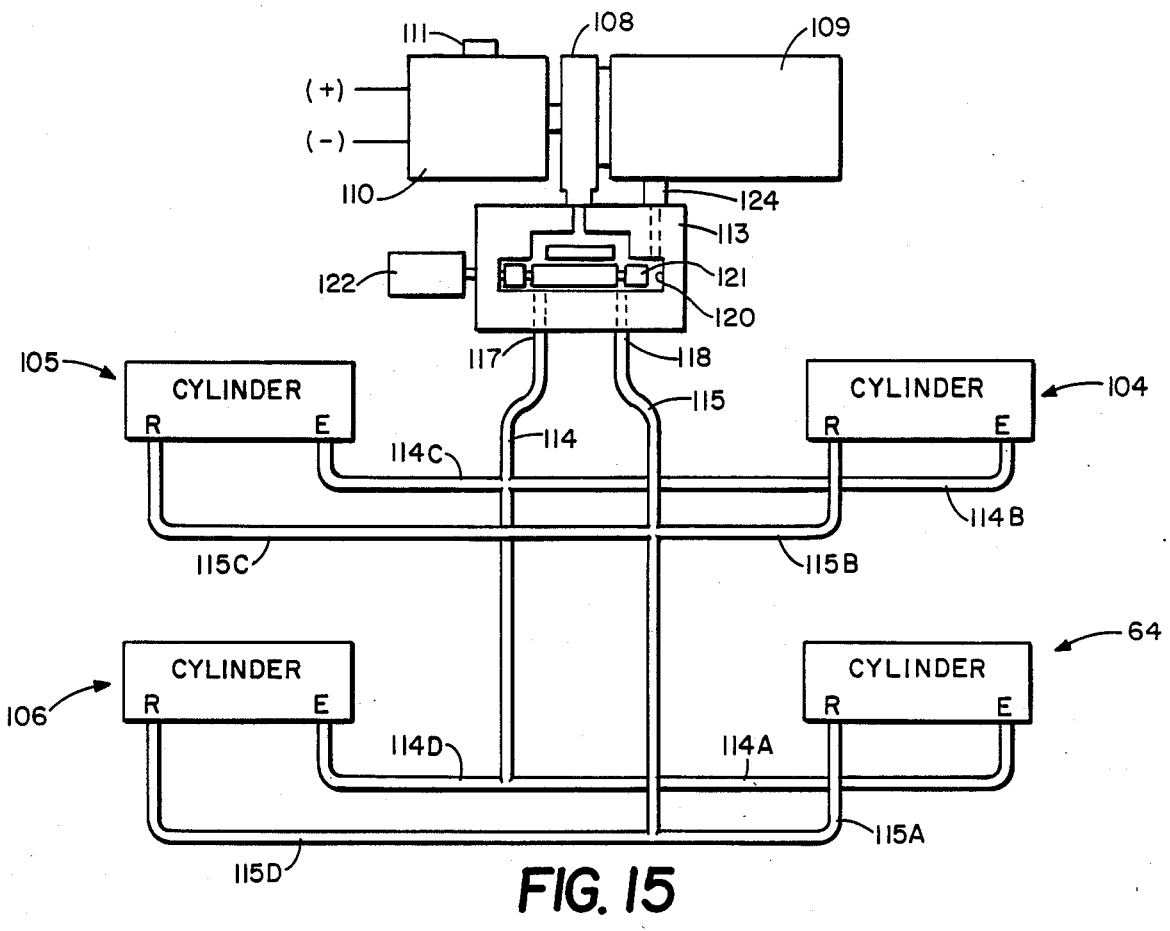
FIG. 15 is a schematic view of the hydraulic circuit of the vehicle leveling apparatus.

An appropriate hydraulic circuit for the vehicle leveling apparatus of the invention is shown in FIG. 15 wherein the right rear hydraulic power unit is indicated at 64, the right front hydraulic power unit at 104, the left front hydraulic power unit at 105 and the left rear hydraulic power unit at 106. The operation of each hydraulic power unit is controlled by one of the toggle switches on the control panel 97 shown in FIG. 9. For example, the toggle switch 99 is operable to control the hydraulic power unit 105 associated with the left front jack stand assembly 25. Each of the hydraulic power units is equipped with two solenoid switches as previously described, and corresponding first and second hydraulic ports. The hydraulic circuit includes a hydraulic pump 108 connected to a fluid reservoir 109 and driven by an electric motor 110 which is actuated by an electric switch 111. A manifold 113 is connected to the output of the hydraulic pump 108.

A first hydraulic line 114 extends from the manifold 113 to branches 114 A-D which connect to the first hydraulic fluid port of each hydraulic cylinder, or the port through which the introduction of hydraulic fluid pressure will result in extension of the jack stand assembly. For the hydraulic power unit 64 of FIG. 7, this is the first or extend port 78. A second hydraulic line 115 extending from the manifold 113 has branches 115 A-D directed to the second or retract hydraulic ports of each of the hydraulic power units, or the port through which the introduction of hydraulic fluid under pressure results in retraction of the jack stand assembly. This corresponds to the second port 79 on the hydraulic power unit 64 of FIG. 7.

First and second hydraulic line 114, 115 are connected to first and second hydraulic fluid outlets 117, 118 from the manifold 113. These outlets communicate with a spool valve element 121 operated by a solenoid 122. A return line 124 returns hydraulic fluid from the manifold 113 to the reservoir 109. In the normal or first position, the spool valve element 121 is orientated to allow flow of hydraulic fluid under pressure from the pump through a first passageway over the spool valve element and to the first hydraulic line 114. The valve element 121 closes the input from the hydraulic pump 108 to the second hydraulic fluid line 115 but permits hydraulic fluid to pass from the hydraulic fluid line 115 through the manifold and to the return line 124 to the reservoir. When the solenoid 122 is energized, it moves the spool valve to a position where hydraulic fluid under pressure passes from the pump 108 through the second hydraulic line 115 while closing off the outlet 117 to the first hydraulic line 114. In this position, hydraulic fluid can pass from the hydraulic line 117 back across the spool valve into the return passage 124 to the reservoir 109. According to whether or not the solenoid is energized, upon operation of pump 108 hydraulic fluid under pressure is provided in either the first or second hydraulic supply lines 114, 115 and permitted to return through the other.

Figure 16:
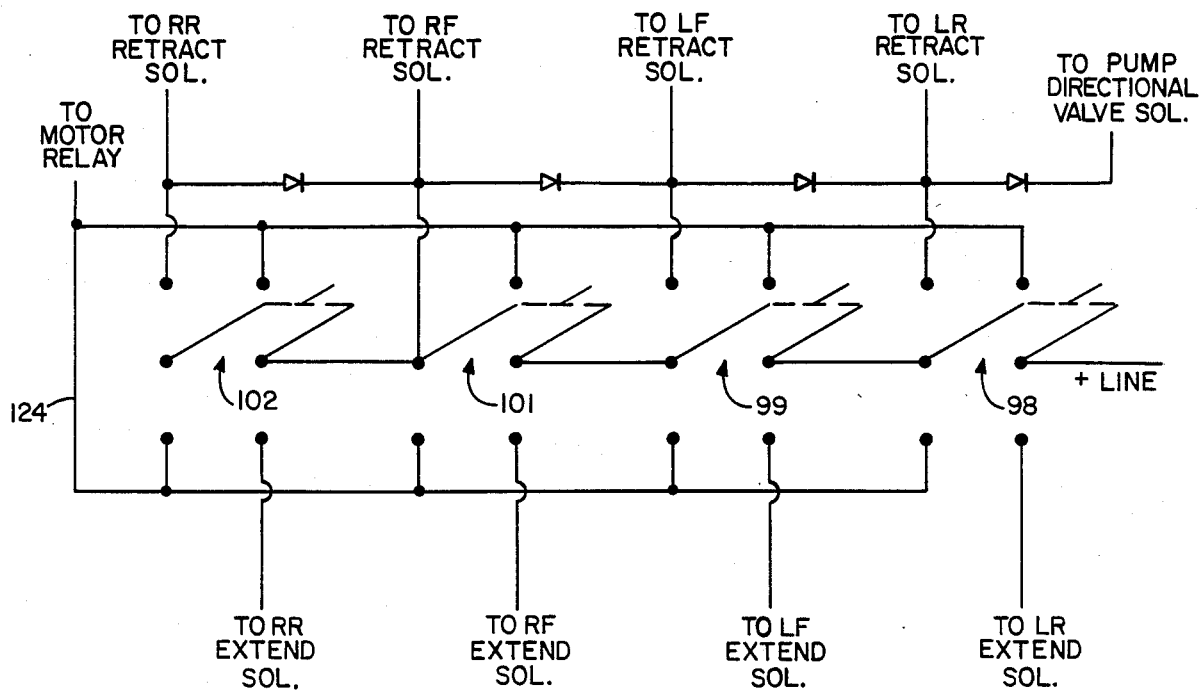
FIG. 16 is a schematic view of an electrical circuit controlling extension and retraction of the jack stands of the vehicle leveling apparatus.

Each of the toggle switches of control panel 97 is double pole-double throw variety as indicated in FIG. 16 which schematically depicts an electrical circuit for operation of the jack stand assemblies. Switches 98–102 are indicated positive when open and can be moved up or down to result in operation of pump 108 to pressurize one of the two hydraulic lines 114, 115 while at the same time energizing a solenoid operated valve to permit return flow of hydraulic fluid through the other line. One side of each switch is connectable to a first electric lead 124 which leads to the motor relay 111 to energize the pump 108. When a solenoid switch is moved downwardly to the extend position, the relay 111 is energized to operate the pump to pressurize hydraulic fluid in the first hydraulic line 114. Hydraulic fluid under pressure is at the first hydraulic port of each of the cylinders. At the same time, the toggle switch is operable to energize a solenoid associated with a second hydraulic port of one of the cylinders, opening the port and permitting hydraulic fluid to pass back into the second hydraulic line 115 and through the manifold 113 to the reservoir 109. For example, movement of the toggle switch 102 downwardly connects the motor relay energizing pump 108 and pressurizing hydraulic fluid at the first hydraulic port 78 of hydraulic power unit 64. The switch also closes the electrical circuit to energize the second solenoid valve 84 to lift the valve element 87A and permit fluid flow from the rear portion of cylinder 66 into the line 115 as hydraulic fluid flows under pressure through the first port 78 into the forward end of the hydraulic cylinder 66. This moves the piston 68 rearwardly and results in extension of the jack stand 24.

Movement of the toggle switch 102 upwardly again closes the circuit to the motor relay 111 to energize the hydraulic fluid pump 108. It also closes the circuit to the solenoid 122 to move the spool 121 in the valving chamber 120 and direct hydraulic fluid under pressure through the second hydraulic line 115 which leads to the retract port of each of the cylinders. The first solenoid 83 is also energized to move the valve element 87 and permit outflow of hydraulic fluid through the first hydraulic port 78 from the forward portion of hydraulic cylinder 66 to the hydraulic line 114A as hydraulic fluid under pressure enters the second hydraulic port 79. This advances the piston 68 in the cylinder resulting in retraction of the jack stand 24. The other toggle switches are operable for control of the hydraulic power units for extension and retraction of the remaining jack stand assemblies.

Figure 9:
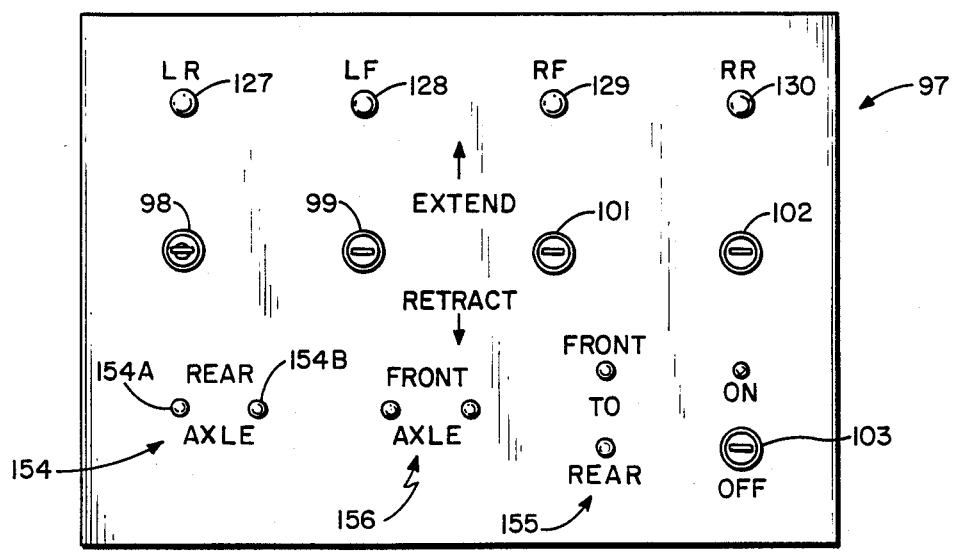
FIG. 9 is a schematic view of a control panel of the vehicle leveling apparatus.

As shown in FIG. 9. control panel 97 has indicator lamps 127, 128, 129, and 130 which illuminate to indicate extension of the respective jack stand assemblies. For example, indicator lamp 130 indicates extension of the jack stand assembly 24 by illumination immediately upon movement of the support plate 30 away from the mounting plate 29 from the closed configuration. As shown in FIG. 3, a micro switch 132 is mounted near the end of the mounting plate 29 at the end of the path of roller assembly 50. Micro switch 132 is mounted by a single fastener 133 which permits some frictional pivotal movement for adjustment. The micro switch 132 has a spring-loaded switch element 134. In the closed position, the roller assembly 50 bears against the switch element 134 moving it toward the left as shown in FIG. 3 to open the switch. The micro switch 132 is connected in series with the lamp 130 and through a suitable power source, such as the vehicle battery. When the jack stand assembly 24 is in the fully closed or retracted position, the roller assembly 50 holds the switch element 134 against the switch 132 and holds the circuit open. Upon movement of the roller assembly to extend the support plate 30, the switch is closed and the lamp 130 is illuminated whereby the vehicle operator is aware of the status of the jack stand asseembly. The remaining lamps give corresponding indication of extension of the respective jack stand assemblies.

Figure 12:
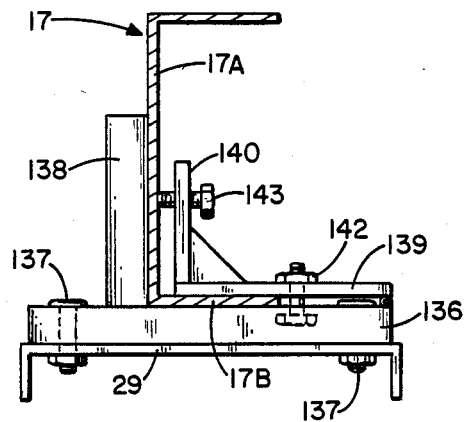
FIG. 12 is a view partly in section of a mounting clamp for a jack stand assembly.
Figure 13:
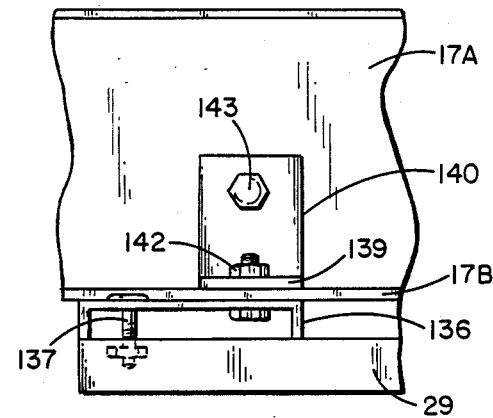
FIG. 13 is a side elevational view of the mounting clamp of FIG. 12.

Various mounting means can be provided for mounting the jack stand assemblies to the motor vehicle 10. One such clamp apparatus is shown in FIGS. 12 and 13 wherein the mounting plate 29 of jack stand assembly 24 is mounted to the longitudinal support beam 17 of motor vehicle 10. Support beam 17 has an upright side wall 17A, a lower horizontal wall 17B, and a top horizontal wall 17C. A clamp apparatus includes a lower channel shaped clamping plate 136 secured by nut and bolt assemblies 137 to the support plate 29. Clamping plate 136 is a downwardly open channel shaped member as shown in FIG. 13. An upwardly extended arm 138 is secured to the top surface of plate 136 and is positoned in abutting relationship to the side wall 17A of longitudinal support beam 17. An L-shaped upper clamping member includes a horizontal leg 139 and a vertical leg 140. The lower horizontal wall 17B of support beam 17 is clamped between the horizontal leg 139 of the L-shaped clamping member and the top wall of the lower clamp member 136 by a nut and bolt assembly 142. A lock bolt 143 is threaded through the vertical leg 140 of the L-shaped clamping member on the opposite side of the side wall 17A of support beam 17 from the upstanding leg 138. Lock bolt 143 is tightened against the side of the longitudinal support beam 17 against the upstanding leg 138. Support plate 29 of jack stand is securely held in place by the lock bolt and nut and bolt assembly 142.

Figure 14:
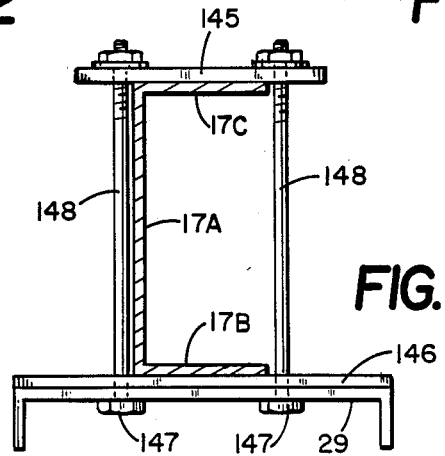
FIG. 14 is a front plan view, partly in section, of another form of mounting clamp for a jack stand assembly.

Another clamping arrangement is shown in FIG. 14 wherein there is provided an upper clamping plate 145 and a lower clamping plate 146 which straddle the upper and lower walls 17C, 17B of longitudinal support beam 17. Nut and bolt assemblies 147 having elongate shanks 148 pass through the support plate 29 of the jack stand assembly 24, through the lower support plate 146 and through the upper support plate 145, being securely in place. Other suitable mounting arrangements and clamping devices could be employed.

Various level sensors according to the invention are located about the motor home 10 to indicate level and off level conditions when the vehicle is parked and the leveling procedure is under way. A first level sensor 150 is located on the lateral cross beam 19 adjacent floor of the motor vehicle for indicating lateral or side to side leveling at the rear of the vehicle. A second level sensor 151 is located midway of the longitudinal axis of the vehicle and can be mounted to the under surface of the floor and orientated to indicate longitudinal or front to rear leveling of the motor vehicle. A third level sensor is located forward on the motor vehicle 10 orientated to indicate lateral or side to side leveling at the front of the vehicle.

Each level sensor is associated with a separate pair of signal lamps located on the control panel 97 shown in FIG. 9. The first pair of signal lamps 154 is associated with the first level sensor 150 and are marked rear axle for the convenience of the operator. When both lamps are illuminated, a level condition is indicated. When only one lamp is illuminated, an indication is given in the direction of off level. The lamps 154 are arranged in side-by-side or horizontal orientation as viewed by the operator indicative to the operator of the orientation of the rear axle. A second pair of lamps correspond to the second level sensor 151. The second lamps are located in vertical alignment indicative to the operator of longitudinal level adjustment. Both lamps illuminated indicates level. Illumination of only one lamp or the other indicates off level in a direction indicated by the illuminated lamp. A third pair of lamps 156 are connected to the third level sensor 152 and are located in side-by-side relationship. The lamps are connected through the respective level sensors and a power source (not shown) such as the vehicle battery. The lamps are also connected through the On-Off switch 103.

Figure 10:
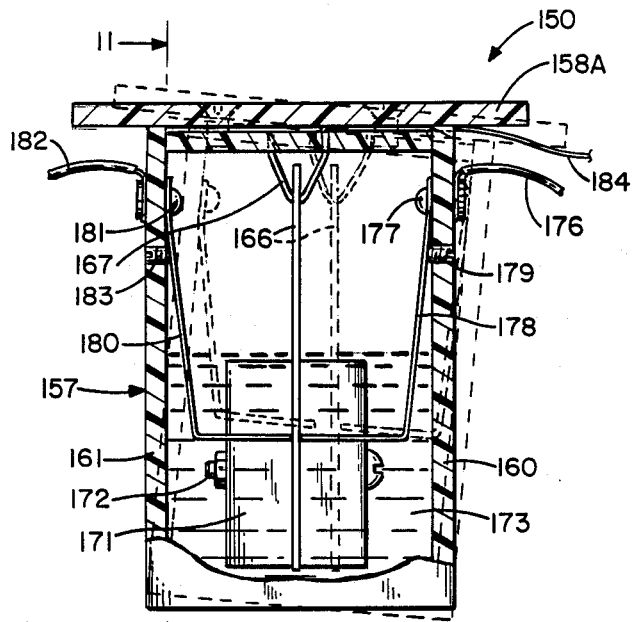
FIG. 10 is a side elevational view, partly in section for purposes of illustration, of a level indicating device of the invention.
Figure 11:
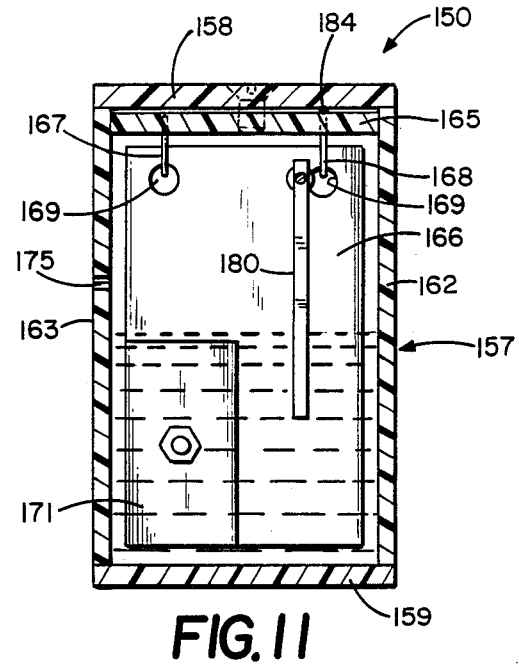
FIG. 11 is a sectional view of the level indicating device of FIG. 10 taken along the line of 11—11 thereof.

A preferred form of level sensor device is shown in FIGS. 10 and 11. An oil damped pendulum-type level sensor 150 is connected to lamps 154. Both lamps illuminated indicates level condition. Sensor 150 comprises a pendulum actuated switch that opens when off-level in one direction to turn off one of the lamps 154A, and opens in the opposite off-level direction to turn off the other lamp 154B.

Level sensor 150 includes a closed housing 157 comprised of top and bottom horizontal walls 158, 159, and vertical side walls 160, 161. Vertical end walls 162, 163 connect to the side walls 161, 162 to close the housing.

An upper horizontal support wall 165 is fastened inside the housing just beneath the top wall 158. A flat plate-like pendulum 166 is formed of electrically conductive material and is suspended in the housing 157 from upper support wall 165. A pair of aligned V-shaped pivot mounts 167, 168 are suspended from the support wall 165. Pivot mounts 167, 168 engage pivot openings 169 located in the upper portion of the pendulum plate 166 to pivotally carry the pendulum 166 in the apexes of mounts 167, 168.

A pendulum weight 171 is fastened to the lower portion of the pendulum plate 166 by a nut and bolt assembly 172. An oil bath 173 fills the lower half of housing 157 and can be introduced to the housing 157 through an oil opening 175 in the end wall 163. Pendulum 171 and oil bath 173 serve to dampen gyration of the pendulum 166.

A first L-shaped electrical contact 178 is fastened to side wall 160 by a mounting screw 177. The lower leg of the contact 178 extends inwardly of the housing 157 toward the pendulum 166. An adjusting screw 179 is threaded through the side wall 160 and engages the elongate leg of the contact 178. Adjusting screw 179 is effective to adjust the top of the contact 178 toward or away from the center of housing 157. The top of contact 178 touches pendulum plate 166 when suspended straight up and down in housing 157. An electrical lead 176 connected to lead 178 through screw 177 and extends to a first of the lamps 154.

A second L-shaped contact 180 is mounted symmetrically to first contact 178 on the opposite side wall 161. A mounting screw 181 holds the upper end of the elongate leg of the L-shaped contact to an upper portion of the side wall 161. The lower leg of the contact 180 extends inwardly in housing 157 in straddling relationship to the pendulum plate 166 at a location behind the pendulum weight 171. The tip of contact 180 touches the pendulum plate 166 when it is straight up and down. A second lead 182 extends to a second of the lamps 154 on control panel 97. A second adjusting screw 183 is threaded through a suitable opening in the second side wall 161 to a position of contact with the elongate leg of electrical contact 180 to move the tip thereof inward or outward of the housing 157 and vary the sensitivity of the contact with pendulum plate 166.

A third electrical lead 184 extends from one of the pivots 168 to the control panel 97. Formation of an electrical circuit between the pendulum 166 and one or both of the first and second electrical contacts 178, 180 closes a circuit and illuminates one or both of the lamps.

In full line position shown in FIG. 10, the pendulum 166 is in a straight up and down or vertical position located between the contacts 178, 180 and in contact with both of them. Both of the lamps 154A, B are illuminated. In an off-level condition as indicated by broken lines in FIG. 10, the pendulum 166 swings in one direction, or in a right direction as indicated in FIG. 10. Pendulum 166 leaves second contact 180, opening a circuit to darken one of the lamps 154 and indicate the off-level condition. The direction of off-level is indicated by the lamp which is darkened. The sensitivity, or degree of off-level needed to open the circuit, is regulated by the adjusting screws 179, 183. Oil bath 173 serves to stabilize the pendulum from random gyration and inhibit electrical arc. Top wall 158 has overlapping portions 158A which for mounting level sensor 150 under the floor of motor vehicle 10 or other appropriate location.

In use of the vehicle leveling apparatus, jack stand assemblies are assembled at quadrants of the motor vehicle 10. The motor vehicle operator selects a likely camping site and parks the motor home. The On-Off 103 switch of control panel 97 is energized. Jack stand assemblies are extended to engage the ground. Lamps 154–156 indicate the level condition of the unit. Individual jack stand assemblies are extended or retracted through operation of the toggle switches 98, 99, 101 and 102 and manipulated until a level condition is achieved. The entire operation is accomplished quickly without disturbing other persons in the vehicle. Lamps 127–130 indicate which jack stand assemblies are extended. The operator retracts the jack stand assemblies before departing. The warning lamps will indicate any that are not fully retracted.

While there have been shown and described certain embodiments of the invention, it will be apparent that certain deviations and changes can be had without departing from the scope and spirit of the invention.

The embodiments of the invention in which an exclusive property or privilege is claimed are defined as follows:

1. A level sensing apparatus comprising:
a housing having upper support means;
an electrically conductive pendulum comprised as a flat plate-like member with planar surfaces
pivot means connected to the upper support means pivotally suspending the pendulum in the housing permitting back and forth movement relative to the housing in an arcuate path about a fixed axis that is parallel to the planar surfaces of the pendulum;

a first resilient electrical contact attached at a first end to the housing and having a second end located proximate the pendulum and in the arcuate path of movement of the pendulum;

a first electrical lead extending from the first electrical contact;

a second resilient electrical contact attached at a first end to the housing and having a second end located proximate the pendulum in the arcuate path of and on the side of the pendulum opposite the first contact;

a second electrical lead extending from the second contact;

a third electrical lead extending from the pendulum;

means for introduction of electricity through the third electrical lead;

a first electrically actuated indicating device located in a first electrical circuit including the pendulum, the third electrical lead, the first electrical lead and the first contact;

a second electrically actuated indicating device located in a second electrical circuit including the pendulum, the third electrical lead, the second electrical lead and the second electrical contact whereby upon inclination of the housing in a direction to swing the pendulum, it makes a circuit with one of the electrical indicating devices to the exclusion of the other to indicate a direction of off level.

2. The level indicating apparatus of claim 1 wherein: when the pendulum is in an up-and-down orientation, the first and second electrical contacts are in contact with the pendulum.

3. The level sensing apparatus of claim 2 wherein: said electrically actuated devices are comprised as lamps.

4. The level sensing apparatus of claim 3 wherein: said first and second electrical contacts are comprised as L-shaped members having one leg fixed to a housing side wall and the second leg generally perpendicular to the first leg an extending inwardly of the housing to a position of contact with the pendulum when the pendulum is in a straight up and down position.

5. The level sensing apparatus of claim 4 wherein: said pendulum is generally rectangular.

6. The level sensing apparatus of claim 5 including: a pendulum weight fixed to the flat plate near the lower end thereof.

7. The level sensing apparatus of claim 6 wherein: said housing is a closed housing and including an oil bath partially filling the housing.

8. The leveling sensing apparatus of claim 4 including: threaded adjusting screws threaded through housing side walls and having contact with the first leg of each electrical contact in order to adjust the sensitivity of the contact.

9. The level sensing apparatus of claim 1 wherein: said first and second electrical contacts are comprised as L-shaped members having one leg fixed to a housing side wall and a second leg generally perpendicular to the first leg and extending inwardly of the housing to a position of a contact with the pendulum when the pendulum is in the straight up and down position.

10. The level sensing apparatus of claim 9 wherein: said electrically actuated devices are comprised as lamps.

11. The level indicating apparatus of claim 10 wherein: said housing is a closed housing and including an oil bath partially filling said housing to dampen the pendulum.

12. The level sensing apparatus of claim 1 wherein: said pendulum has an upper edge and at least one pivot opening near the upper edge, said pivot means connected to the upper support means including a V-shaped pivot mount engaging the pivot opening.

13. The level sensing apparatus of claim 1 wherein: said pendulum has an upper edge and a pair of pivot openings positioned near the upper edge, said pivot means including a pair of V-shaped pivot mounts engaging the pivot openings of a pendulum and secured to the upper support means.

14. The level sensing apparatus of claim 1 wherein: said housing has side walls normally parallel to the pendulum on opposite sides of the pendulum, said first ends of the electrical contacts having portions situated adjacent the side walls, and including means for adjustment of the sensitivity of the pendulum comprised as adjusting screws mounted in the housing side walls and bearing against the first ends of the electrical contacts tending the keep the second end of the electrical contacts in initial contact with the pendulum upon initial tilting of the pendulum.

15. The level sensing apparatus of claim 14 including: a pendulum weight fixed to the pendulum near the lower end thereof.

16. The level sensing apparatus of claim 15 wherein: said housing is a closed housing and including an oil bath partially filling the housing.

17. The level sensing apparatus of claim 16 wherein: said electrically actuated devices are comprised as lamps.

* * * * *

UNITED STATES PATENT AND TRADEMARK OFFICE
CERTIFICATE OF CORRECTION

PATENT NO. : 4,887,359

DATED : December 19, 1989

INVENTOR(S) : WALTER E. HOFIUS

It is certified that error appears in the above-identified patent and that said Letters Patent is hereby corrected as shown below:

Col. 1, lines 31-34, delete "jack stand assembly includes a double acting hydraulically actuated scissor-type jack, extendable and retractable through hydraulic control from the cab of the vehicle."

Col 1, line 51, "sensor" should be --- sensors ---.

Col. 2, line 42, "fame" should be --- frame ---.

Col. 2, line 53, "desireable" should be --- desirable ---.

Col. 2, line 53, "stabalize" should be --- stabilize ---.

Col. 3, line 36, delete "in".

Col. 4, line 16, "accomplished" should be --- accomplishes ---.

Col. 5, line 17, "truncuated" should be --- truncated ---.

Col. 6, line 55, "line" should be --- lines ---.

Col. 9, line 63, "top" should be --- tip ---.

Col. 9, line 64, "top" should be --- tip ---.

Col. 10, line 37, delete "which".

Col. 10, line 66, following "surfaces" add --- ; ---.

Col. 11, line 46, "an" should be --- and ---.

UNITED STATES PATENT AND TRADEMARK OFFICE
CERTIFICATE OF CORRECTION

PATENT NO. : 4,887,359

DATED : December 19, 1989

INVENTOR(S) : WALTER E. HOFIUS

It is certified that error appears in the above-identified patent and that said Letters Patent is hereby corrected as shown below:

Col. 12, line 42, "the" (third occurrence) should be --- to ---.

Signed and Sealed this

Eighth Day of September, 1992

Attest:

DOUGLAS B. COMER

Attesting Officer      Acting Commissioner of Patents and Trademarks